United States Patent
Iida (10) Patent No.: US 10,802,777 B2
(45) Date of Patent: Oct. 13, 2020

(54) INFORMATION PROCESSING APPARATUS, INFORMATION PROCESSING METHOD, AND RECORDING MEDIUM

(71) Applicant: Hirokazu Iida, Kanagawa (JP)

(72) Inventor: Hirokazu Iida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/269,653

(22) Filed: Feb. 7, 2019

(65) Prior Publication Data

US 2019/0286394 A1    Sep. 19, 2019

(30) Foreign Application Priority Data

Mar. 19, 2018 (JP) ................................ 2018-051176

(51) Int. Cl.
*G06F 3/12* (2006.01)
*H04N 1/00* (2006.01)

(52) U.S. Cl.
CPC ............ *G06F 3/1247* (2013.01); *G06F 3/122* (2013.01); *G06F 3/1288* (2013.01)

(58) Field of Classification Search
CPC ...... G06F 3/122; G06F 3/1285; G06F 3/1288; G06F 3/1248; G06F 3/1245; G06F 3/1247
USPC .......... 358/1.11–1.18, 1.9, 2.1; 715/234, 235
See application file for complete search history.

(56) References Cited

U.S. PATENT DOCUMENTS

| | | | | |
|---|---|---|---|---|
| 5,819,301 A * | 10/1998 | Rowe | ..................... | G06F 17/211 715/235 |
| 6,538,760 B1 * | 3/2003 | deBry | ..................... | G06F 3/1211 358/1.13 |
| 7,072,055 B1 * | 7/2006 | Carter | ..................... | G06F 3/1204 358/1.15 |
| 9,304,719 B1 * | 4/2016 | Bilan | ..................... | G06F 3/1241 |

(Continued)

FOREIGN PATENT DOCUMENTS

| | | |
|---|---|---|
| JP | 2004-348423 | 12/2004 |
| JP | 2015-026134 | 2/2015 |

OTHER PUBLICATIONS

Title: Document Management—Portable Document Format—Part 1: PDF 1.7. First edition: Jul. 1, 2018. Adobe Systems Incorporated 2008. Link https://www.adobe.com/content/dam/acom/en/devnet/pdf/pdfs/PDF32000_2008.pdf (Year: 2008).*

*Primary Examiner* — Chad Dickerson
(74) *Attorney, Agent, or Firm* — Harness, Dickey & Pierce P.L.C.

(57) ABSTRACT

An information processing apparatus for communicating with an image forming apparatus includes processing circuitry that creates a second document file from a first document file including data of a plurality of pages, the second document file being created such that respective data of the plurality of pages are arranged in page order in the second document file, and a communication interface that transmits the created second document file to the image forming apparatus. The data arrangement of the second document file includes: first discrimination information for discriminating boundaries between the respective data of the plurality of pages; and second discrimination information for discriminating a drawing object supported by the image forming apparatus from a drawing object not supported by (Continued)

the image forming apparatus among drawing objects included in the first document file.

11 Claims, 9 Drawing Sheets

(56) References Cited

U.S. PATENT DOCUMENTS

2004/0098410 A1* 5/2004 Ozawa .................... G06F 3/122
2005/0033769 A1* 2/2005 Mifune ................ G06F 17/217

* cited by examiner

INFORMATION PROCESSING APPARATUS, INFORMATION PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2018-051176, filed on Mar. 19, 2018, in the Japan Patent Office, the entire disclosure of which is hereby incorporated by reference herein.

BACKGROUND

Technical Field

The present invention relates to an information processing apparatus, an information processing method, and a recording medium.

Discussion of the Background Art

An image forming apparatus such as a multifunction peripheral (MFP) receives a file created in various formats, such as Printer Control Language (PCL), PostScript (PS), and Portable Document Format (PDF), and performs a printing process. In a sequential-access file, such as files in PCL and PS, respective data of pages are arranged in page order. Therefore, an image forming apparatus can sequentially read and print the respective data of the pages while receiving the sequential-access file. On the hand, in a document file recorded in a randomly-accessible manner, such as a PDF file, respective data of pages can be arranged not in page order. Therefore, after completion of receiving the entire document file, an image forming apparatus accesses and prints the respective data of the pages while referring to structural information of the document file provided in the last part of the document file.

SUMMARY

Example embodiments include an information processing apparatus for communicating with an image forming apparatus, includes processing circuitry that creates a second document file from a first document file including data of a plurality of pages, the second document file being created such that respective data of the plurality of pages are arranged in page order in the second document file, and a communication interface that transmits the created second document file to the image forming apparatus. The data arrangement of the second document file includes: first discrimination information for discriminating boundaries between the respective data of the plurality of pages; and second discrimination information for discriminating a drawing object supported by the image forming apparatus from a drawing object not supported by the image forming apparatus among drawing objects included in the first document file.

Embodiments include an information processing method, and a recording medium storing a control program for causing a computer to perform the information processing method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

One or more embodiments of the present invention will be described below with reference to the drawings.

Figure 1:
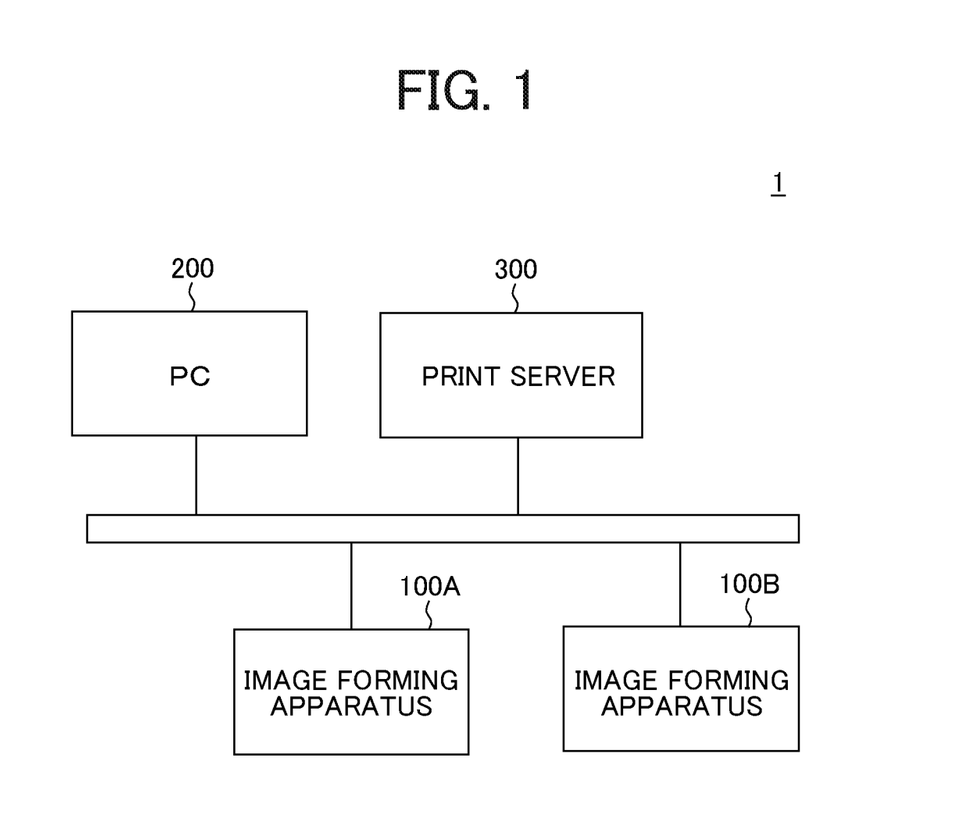
FIG. 1 is a diagram illustrating an example of a communication system according to an embodiment of the present invention.

FIG. 1 is a diagram illustrating an example of a communication system 1 according to the embodiment of the present invention. As illustrated in FIG. 1, the communication system 1 includes an image forming apparatus 100, a personal computer (PC) 200, and a print server 300 connected via a communication network 400.

The image forming apparatus 100 provides an image processing function and a communication function. Examples of the image forming apparatus 100 include a multifunction peripheral (MFP), a facsimile, a scanner, and a printer. An image forming apparatus 100A illustrated in FIG. 1 may be, for example, an MFP having facsimile, scanner, and printer functions. An image forming apparatus 100B may be, for example, a printer. The image forming apparatus 100 can print a Portable Document Format (PDF) file separately page by page. A plurality of the image forming apparatuses 100 may be included in the communication system 1.

The PC 200 is an example of an information processing apparatus having a communication function. The PC 200 may be, for example, a smart device such as a tablet and a smartphone, a notebook PC, etc. Other examples of the information processing apparatus include a teleconference terminal, an electronic blackboard, and a camera. The PC 200 can store a PDF file in the print server 300. In addition, the PC 200 can transmit a PDF file to the image forming apparatus 100. Furthermore, the PC 200 can instruct the image forming apparatus 100 to print the PDF file stored in the print server 300.

The print server 300 is an information processing apparatus having a communication function. The print server 300 functions as a print server that stores and manages a document file, such as a PDF file, and transmits the document file to the image forming apparatus 100, based on a request from the PC 200 or the image forming apparatus 100. Furthermore, the print server 300 has a function of document file conversion to be described below.

The image forming apparatus 100, the PC 200, and the print server 300 are connected via the communication network 400. The communication network 400 may be, for example, a wired local area network (LAN), a wireless LAN, or a network including the Internet as a part of the network. That is, not all the apparatuses need to be connected to a single network.

The PC 200 and the print server 300 create a random-access document file, such as a PDF file, by using an arbitrary application or driver. The PC 200 and the print server 300 transmit a print request including a document file to the image forming apparatus 100. The image forming apparatus 100 receives the document file transmitted by the PC 200 and the print server 300, and performs a printing process.

Figure 2:
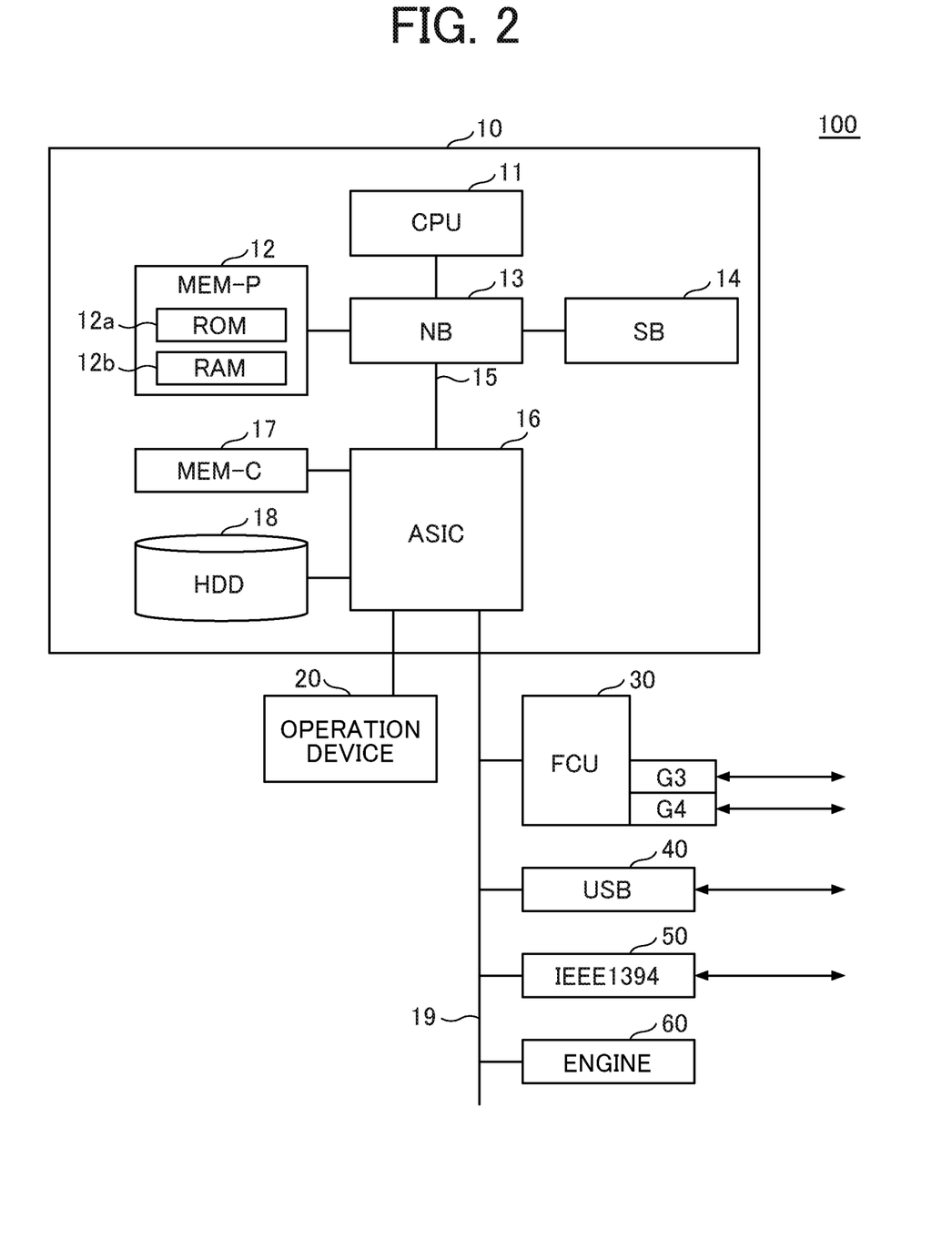
FIG. 2 is a diagram illustrating an example of a hardware configuration of an image forming apparatus according to the embodiment of the present invention.

FIG. 2 is a diagram illustrating an example of a hardware configuration of the image forming apparatus 100 according to the embodiment of the present invention. As illustrated in FIG. 2, the image forming apparatus 100 includes a controller 10 and an engine 60 connected via a Peripheral Component Interconnect (PCI) bus 19. The image forming apparatus 100 includes the controller 10, an operation device 20, a facsimile control unit (FCU) 30, a Universal Serial Bus (USB) 40, an Institute of Electrical and Electronics Engineers (IEEE) 1394 interface 50, and the engine 60. The controller 10 includes a central processing unit (CPU) 11, a system memory MEM-P 12, a read-only memory (ROM) 12a, a random-access memory (RAM) 12b, a northbridge (NB) 13, a southbridge (SB) 14, an Accelerated Graphics Port (AGP) bus 15, an application specific integrated circuit (ASIC) 16, a local memory MEM-C 17, a hard disk drive (HDD) 18, and the PCI bus 19.

The controller 10 controls the entire image forming apparatus 100, for example, to control printing, communication, and input from a control panel.

The engine 60 is a printer engine or the like that can be connected to the PCI bus. Examples of the engine 60 include a monochrome plotter, a one-drum color plotter, a four-drum color plotter, a scanner, and a facsimile unit.

The CPU 11 controls the entire image forming apparatus 100, and is provided with a chip set including the NB 13, the system memory MEM-P 12, and the SB 14. The NB 13 is a bridge for connecting the CPU 11, the MEM-P 12, the SB 14, and the AGP bus 15. The NB 13 includes a memory controller, a PCI master, and an AGP target. The memory controller controls, for example, reading from/writing to the MEM-P 12

The MEM-P 12 is a system memory to be used as, for example, a memory for storing programs and data, a memory for deploying programs and data, and a rendering memory for a printer. The MEM-P 12 includes the ROM 12a and the RAM 12b. The ROM 12a is a read-only memory to be used as a memory for storing programs and data. The RAM 12b is a writable and readable memory to be used as, for example, a memory for deploying programs and data, and a rendering memory for a printer.

The SB 14 is a bridge for connecting the NB 13, a PCI device, and a peripheral device. The SB 14 is connected to the NB 13 via the PCI bus 19. The PCI bus 19 is also connected to a network interface and the like.

The ASIC 16 is an integrated circuit (IC) for image processing that includes a hardware element for image processing. The ASIC 16 has a function of a bridge for connecting the AGP bus 15, the PCI bus 19, the HDD 18, and the MEM-C 17. The ASIC 16 includes a PCI target, an AGP master, an arbiter, a memory controller, a plurality of direct memory access controllers (DMACs), and a PCI unit. The arbiter forms a core part of the ASIC 16. The memory controller controls the MEM-C 17. The plurality of DMACs performs, for example, rotation of image data by hardware logic or the like. Data transfer between the PCI unit and the engine 60 is performed via the PCI bus 19. The ASIC 16 is connected to the FCU 30, the USB 40, and the IEEE 1394 interface 50 via the PCI bus 19.

Figure 3:
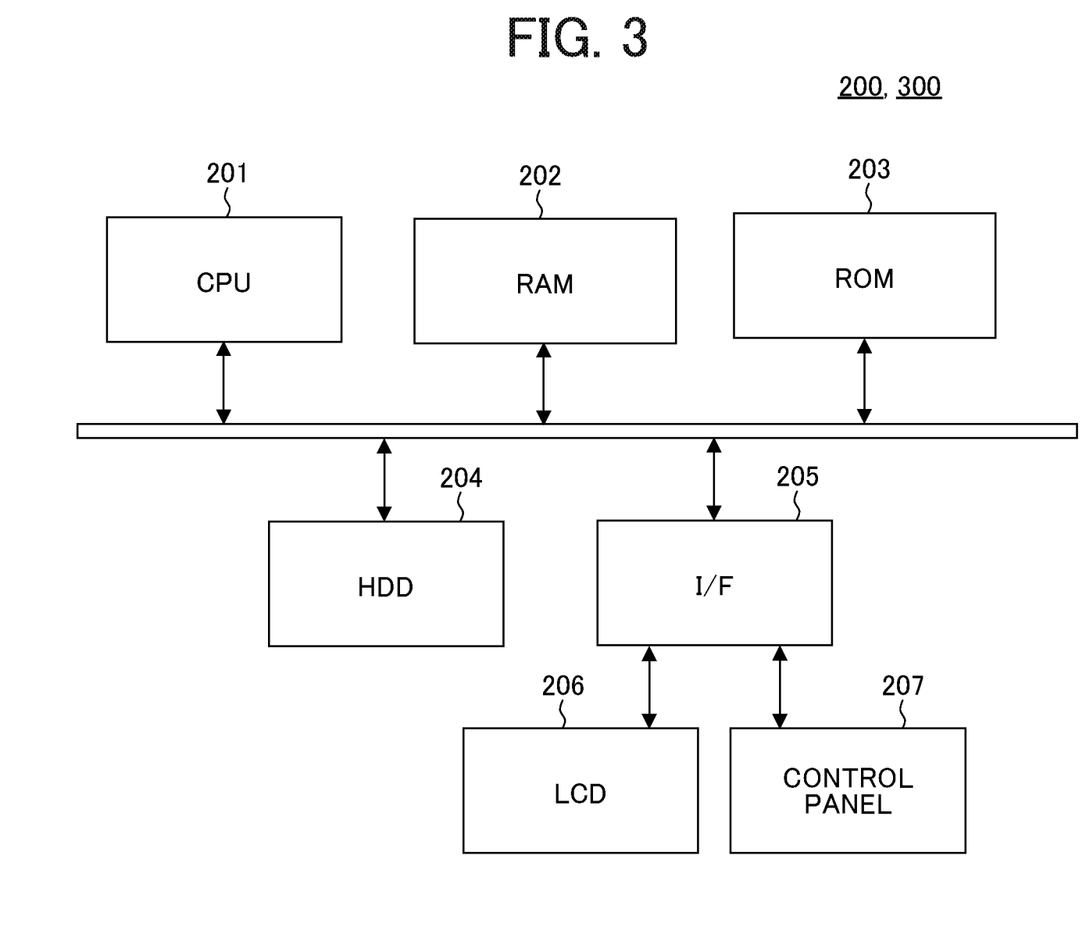
FIG. 3 is a diagram illustrating an example of a hardware configuration of a PC or a print server according to the embodiment of the present invention.

The ASIC 16 is directly connected to the operation device 20. The MEM-C 17 is a local memory to be used as an image buffer for copying and a code buffer. The HDD 18 is a storage device for storing image data, programs, font data, or forms. Furthermore, the HDD 18 holds a license file for an application to be executed in the image forming apparatus 100. The AGP bus 15 is a bus interface for a graphics accelerator card, which may be provided to increase graphics processing speed. The AGP bus 15 can cause the graphics accelerator card to operate at high speed, by directly accessing the MEM-P 12 with high throughput FIG. 3 is a diagram illustrating an example of a hardware configuration of each of the PC 200 and the print server 300 according to the embodiment of the present invention. As illustrated in FIG. 3, the PC 200 and the print server 300 each have a configuration similar to the configuration of a general information processing terminal. The PC 200 and the print server 300 each include a CPU 201, a RAM 202, a ROM 203, an HDD 204, and an interface (I/F) 205 connected via a bus. The I/F 205 is connected to a liquid crystal display (LCD) 206 and a control panel 207.

The CPU 201 is a computing unit, and controls the entire operation of the PC 200 or the print server 300. The RAM 202 is a volatile storage device that allows the reading/writing of information at high speed. The RAM 202 is used as a work area when the CPU 201 processes information. The ROM 203 is a read-only nonvolatile storage device, and stores programs such as firmware. The HDD 204 is a nonvolatile storage medium that enables the reading/writing of information. The HDD 204 stores, for example, an operating system (OS), various control programs or application programs. The I/F 205 connects and controls the bus and various hardware or networks. The LCD 206 is a visual user interface that enables a user to check the state of the PC 200 or the print server 300. The control panel 207 is a user interface, such as a keyboard, a mouse, and a touch panel, for a user to input information to the PC 200 or the print server 300.

Figure 4:
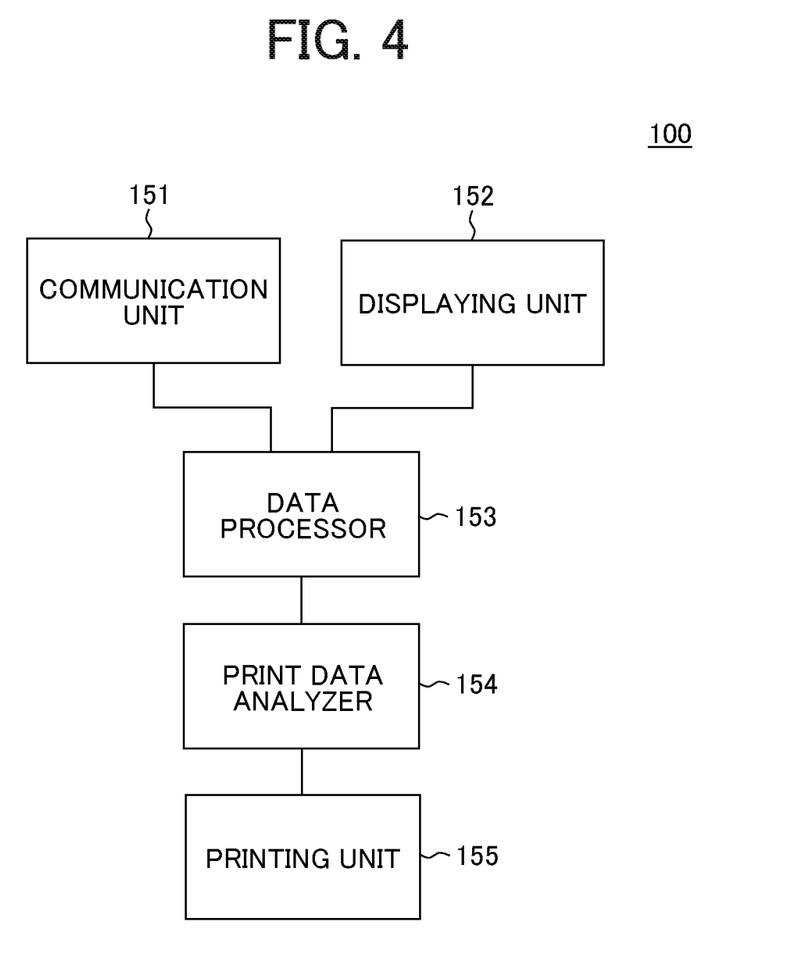
FIG. 4 is a diagram illustrating an example of a functional configuration of the image forming apparatus according to the embodiment of the present invention.

FIG. 4 is a diagram illustrating an example of a functional configuration of the image forming apparatus 100 according to the embodiment of the present invention. As illustrated in FIG. 4, the image forming apparatus 100 includes a communication unit 151, a displaying unit 152, a data processor 153, a print data analyzer 154, and a printing unit 155. Each of the functional units is implemented by the CPU 11 illustrated in FIG. 2, executing a program.

The communication unit 151 has a function of receiving print data, and is implemented by a communication interface such as a network interface circuit. The displaying unit 152 has a function of accepting an instruction from a user and displaying a message for the user. The data processor 153 has a function of performing data processing relating to each functional unit. The print data analyzer 154 has a function of analyzing and rendering print data, and creating a print image. The printing unit 155 outputs an image on a paper sheet based on the created print image.

Figure 5:
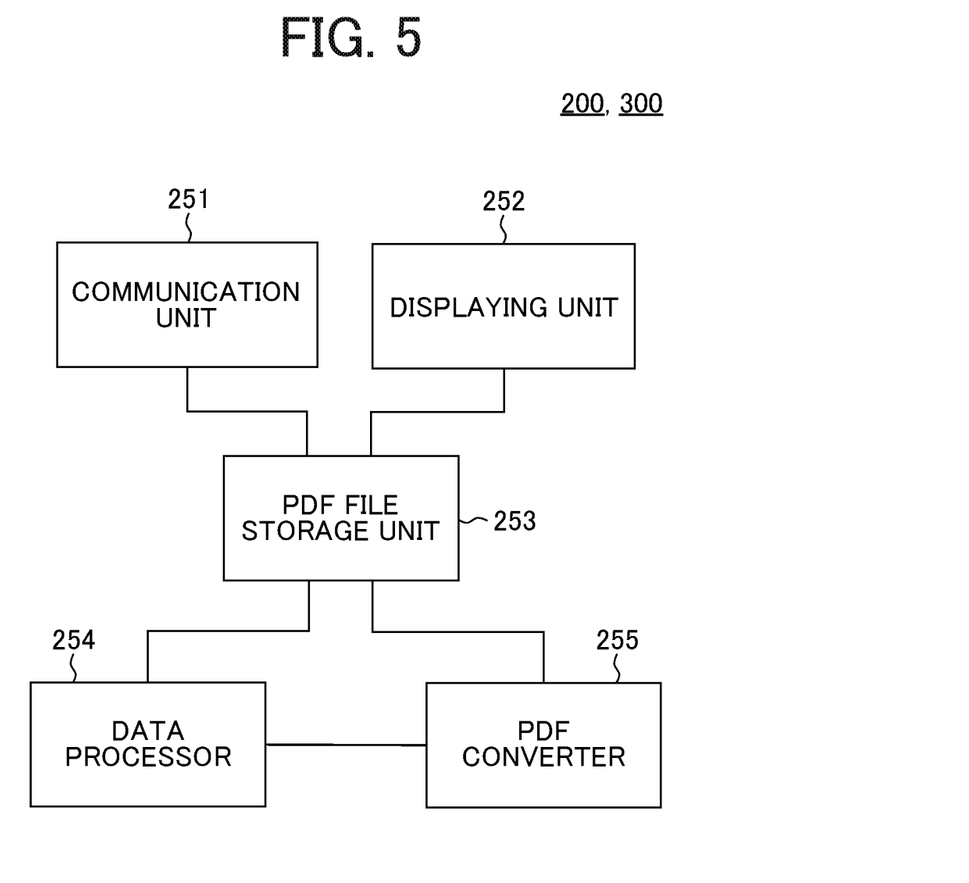
FIG. 5 is a diagram illustrating an example of a functional configuration of the print server according to the embodiment of the present invention.

FIG. 5 is a diagram illustrating an example of a functional configuration of the print server 300 according to the embodiment of the present invention. As illustrated in FIG. 5, the print server 300 includes a communication unit 251, a displaying unit 252, a PDF file storage unit 253, a data processor 254, and a PDF converter 255. Each of the functional units is implemented by the CPU 201 illustrated in FIG. 3, executing a program. Note that the PC 200 may have functions of the print server 300.

The communication unit 251 has a function of transmitting and receiving print data, and is implemented by a communication interface such as a network interface circuit. The displaying unit 252 has a function of accepting an instruction from a user and displaying a message for the user. The PDF file storage unit 253 has a function of storing a PDF file to be printed. The data processor 254 has a function of performing data processing relating to each functional unit. The PDF converter 255 converts the PDF file to be printed into a serialized PDF file. The serialized PDF file refers to a sequential-access file to be described below in detail.

Figure 6A:
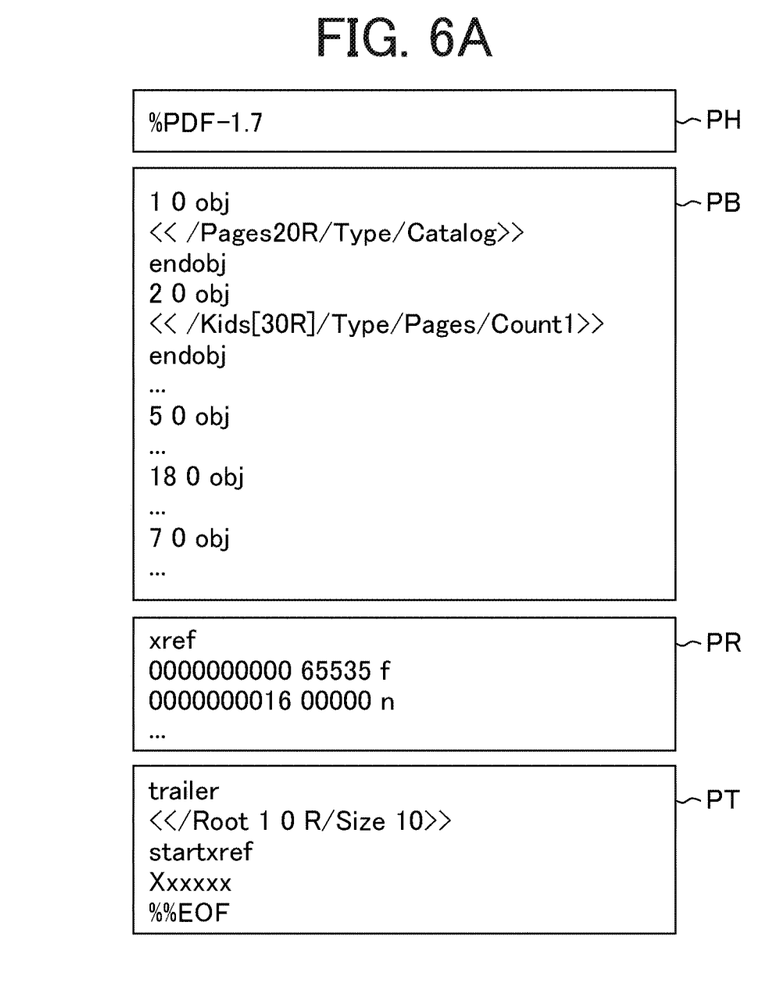
FIGS. 6A and 6B are diagrams for describing a structure of a PDF file according to the embodiment of the present invention.

FIGS. 6A and 6B are diagrams for describing a data structure of a PDF file according to the embodiment of the present invention. As illustrated in FIG. 6A, the data structure of a PDF file includes, in order from the top, a header PH, a body PB, a cross reference table PR, and a trailer PT in conformity with an open standard managed by the International Organization for Standardization (ISO) The header PH, the body PB, the cross reference table PR, and the trailer PT illustrated in FIG. 6A each include information as an example.

The header PH includes PDF version information and the like.

The body PB includes structural information, such as the number of pages of a document, and rendering information for rendering. The structural information and the rendering information are each defined as a set of PDF objects. An identifier is assigned to a PDF object in the form of "X Y obj." The PDF object is referred to based on the identifier. According to the language specification of the PDF, objects need not be arranged in page order. Thus, a reference number "X" for identifying each object need not be a serial number. For example, an identifier "5 0 obj" illustrated in FIG. 6A may be necessary for rendering a fifth page. An identifier "18 0 obj" may be necessary for rendering a first page. An identifier "7 0 obj" may be necessary for rendering a third page. Therefore, before all objects are received, it cannot be determined whether any given page can be rendered.

The cross reference table PR includes address information (positional information) of an object of each object number defined in the body PB. The address information is offset information representing the position of an object as the number of bytes counting from the top of the header PH. Based on the cross reference table PR, the image forming apparatus 100 specifies the position of an object to access the object.

The trailer PT includes address information (startxref) representing the position of the cross reference table PR, an object number "Root" of a document catalog, reference "Info" to the date and time of creation of a PDF file, or the like.

Figure 6B:
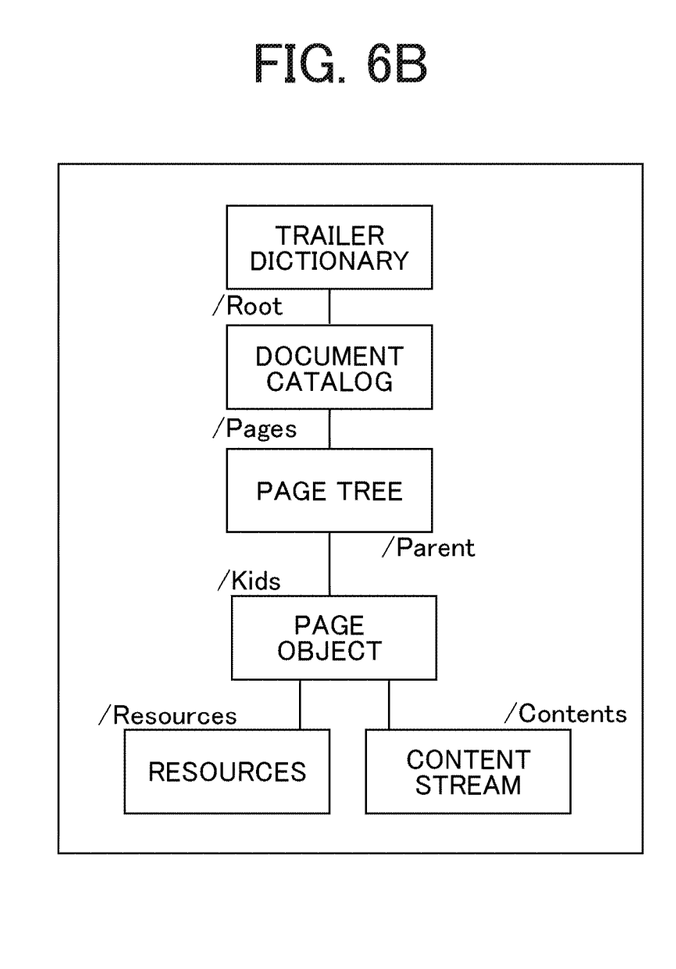

Furthermore, the trailer PT represents a logical structure of an object included in the PDF file illustrated in FIG. 6B. For illustrative purposes, an example of a single page tree is cited. Meanwhile, as a language specification, a page tree can also have a hierarchical structure.

A trailer dictionary included in the trailer PT is located at the top, from which an object referred to as the document catalog is defined as a root "/Root" of the logical structure included in the body PB. The document catalog includes a page tree. The page tree "/Pages" is "/Parent," and includes a page object "/Kids" representing information of each page. Furthermore, the page object includes a resource "/Resources" object for defining resources such as a font and an image, and a content stream "/Contents" in which rendering information is described.

Based on the data structure of the PDF file as described above, the image forming apparatus 100 identifies an object number of the document catalog from the trailer PT, and identifies address information corresponding to the object number from the cross reference table PR, to access the document catalog. That is, in normal operation, the image forming apparatus 100 starts image processing relating to a PDF file after reading the PDF file up to the trailer PT of the PDF file.

Here, assume that a PDF file is divided such that the end of the PDF file is transmitted first, and the rest is transmitted after reception of the cross reference table PR is notified. In the related art, if the PDF file is exchanged in the above-described unique processing flow, an MFP other than an MFP applicable to the processing flow cannot receive the PDF file. Therefore, it is necessary for the transmitting end of the PDF file to change a transmission process of the PDF file for an applicable MFP and for an inapplicable MFP.

In addition, objects are not necessarily arranged in page order in the body PB included in a PDF file. Therefore, in the related art, there is a problem that even if the cross reference table PR is received first, the start of printing is delayed in the case where an object of the first page is located close to the end.

Furthermore, including an object unnecessary for rendering or printing leads to a wasteful use of a memory on the MFP side. However, this is not considered in the related art.

Figure 7A:
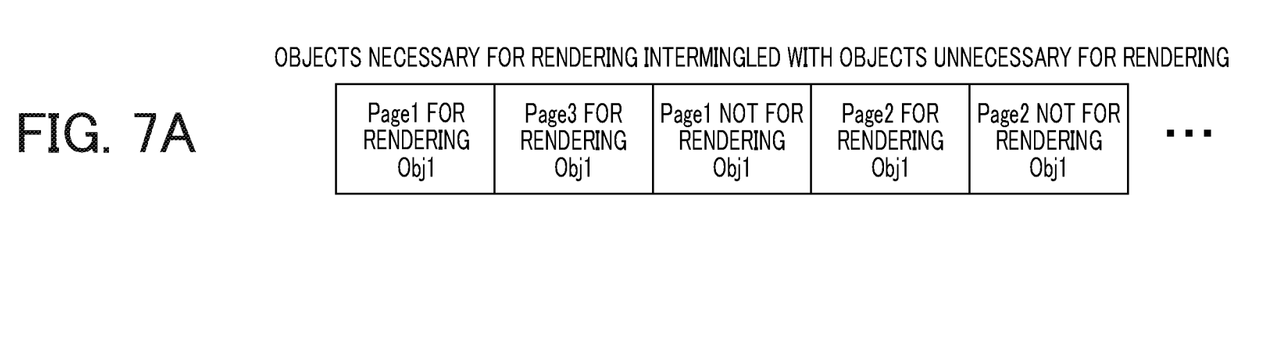
FIGS. 7A and 7B are diagrams for describing an example of data processing according to the embodiment of the present invention.
Figure 7B:
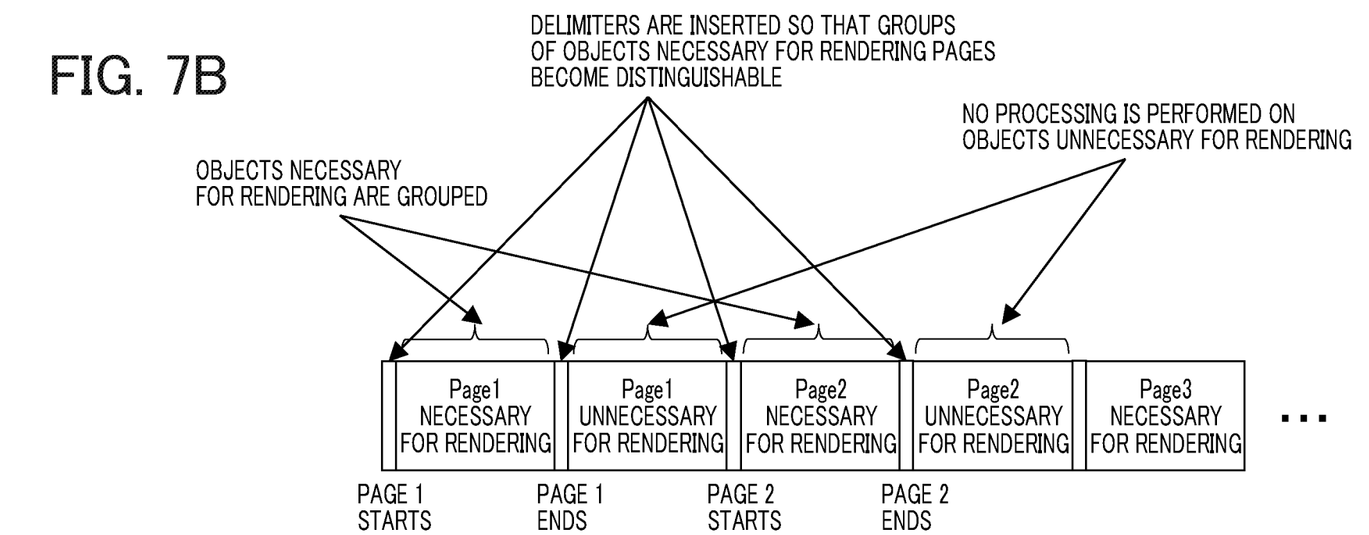

FIGS. 7A and 7B are diagrams for describing an example of data processing according to the embodiment of the present invention. As illustrated in FIG. 7A, a normal PDF file includes objects necessary for rendering a page, intermingled with objects unnecessary for rendering a page. Therefore, as illustrated in FIG. 7B, the objects necessary for rendering are grouped, and delimiters are inserted so that groups of the objects necessary for rendering pages become distinguishable. The delimiters allow the image forming apparatus 100 to perform sequential rendering for each page. Furthermore, the image forming apparatus 100 does not perform any processing on the objects unnecessary for rendering.

Note that the objects unnecessary for rendering may be gathered together at the end of the last page. In the case of locating objects unnecessary for rendering on the last page, it is necessary for the objects unnecessary for rendering to be held in a buffer until completion of creating a PDF file, and to be finally added to the PDF file, on the creation side of the PDF file.

That is, objects of a PDF file are arranged in page order. Then, discrimination information is inserted as a page delimiter, and information indicating that the PDF file has been rearranged in page order is added to the header. A converted PDF file is normally transmitted to the image forming apparatus 100, starting from the top of the PDF file. In the case where the discrimination information is included in the header, the image forming apparatus 100 can start printing without depending on the cross reference table while receiving the PDF file sequentially from the top in page order, based on the page delimiters. Meanwhile, even in the case of an MFP inapplicable to a converted PDF file, the MFP can perform printing with reference to the cross reference table after normally receiving the PDF file up to the end. Therefore, it is not necessary for the transmitting end of the PDF file to consider whether the MFP as the transmission destination is applicable or inapplicable to a PDF file rearranged in page order, that is, a serialized PDF file.

Furthermore, depending on the capability of the image forming apparatus 100 that performs printing, objects are divided into objects necessary for rendering and objects unnecessary for rendering, and then, the objects are arranged in a specific order such that it can be determined whether each object is necessary or unnecessary for rendering. Thus, the image forming apparatus 100 having received the PDF file can separate the necessary portions and the unnecessary portions. The image forming apparatus 100 discards the unnecessary portions according to the order in which the objects are arranged.

Figure 8:
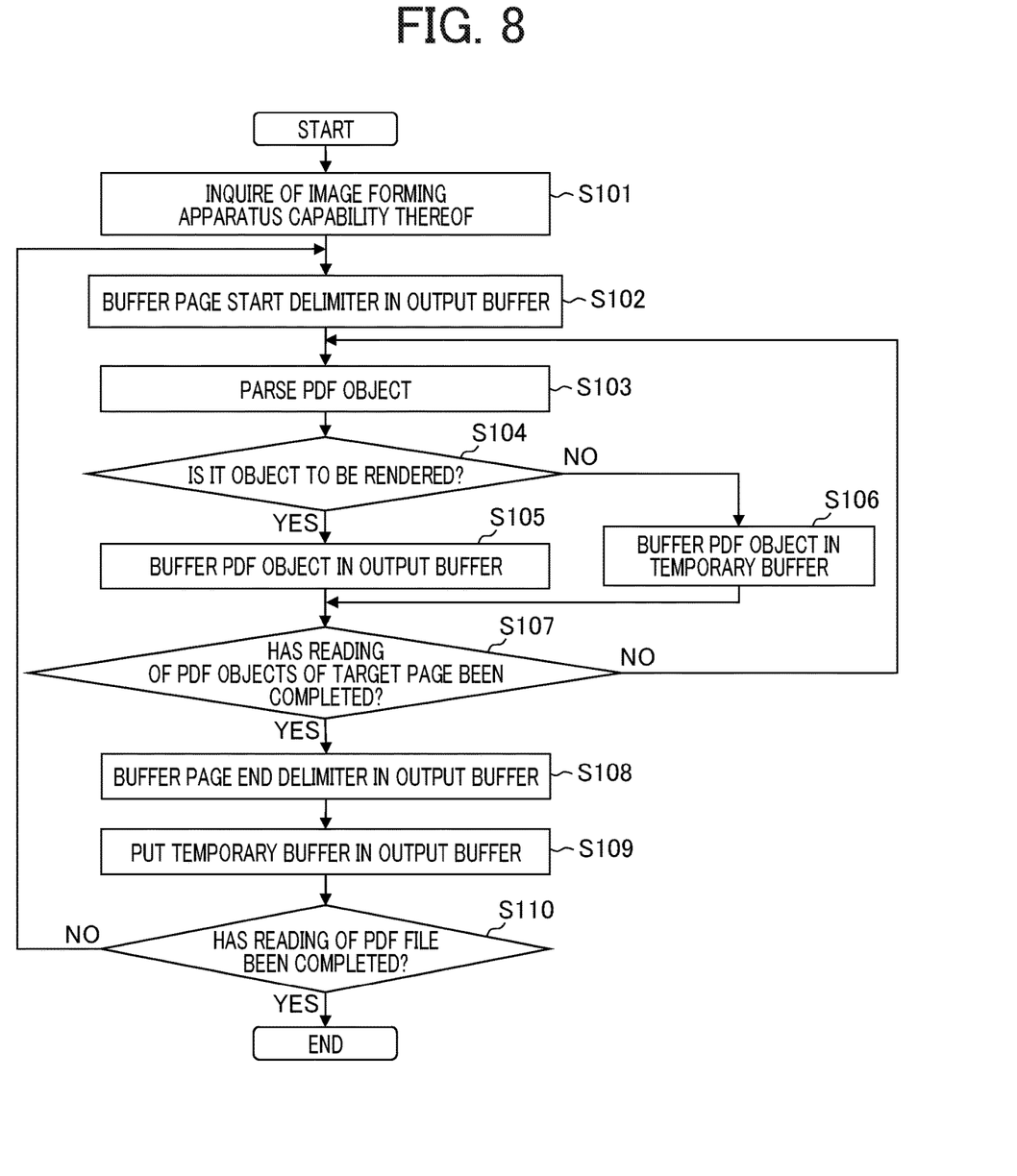
FIG. 8 is a flowchart for describing an example of operation of the print server according to the embodiment of the present invention.

FIG. 8 is a flowchart for describing an example of operation of the print server 300 according to the embodiment of the present invention. According to the flowchart illustrated in FIG. 8, the print server 300 outputs a PDF file obtained by serializing a PDF file received from the PC 200. A serializing process of a PDF file is mainly performed by the PDF converter 255. In the serializing process, information indicating that the PDF file has been rearranged in page order is added to the header of a converted PDF file. Furthermore, information indicating that the PDF file includes page delimiters provided according to the flowchart illustrated in FIG. 8 may be added to the header of the converted PDF file.

In step S101, the print server 300 inquires of the image forming apparatus 100 the capability of the image forming apparatus 100. Table 1 is a table for determining which drawing object can be rendered by the image forming apparatus 100.

TABLE 1

| Target Command | Supported/Not Supported |
|---|---|
| Drawing Object 1 | Supported |
| Drawing Object 2 | Not Supported |
| ... | ... |

With respect to a table illustrated in Table 1, a table associated with the model and version of the image forming apparatus 100 may be previously held in the print server 300, or may be forwarded to the print server 300 when an inquiry is made to the image forming apparatus 100 at the time of printing. In step S101, based on the obtained table, the print server 300 obtains information indicating which drawing object can be rendered by the image forming apparatus 100. The print server 300 uses the information, in step S104, so as to determine whether a PDF object is an object to be rendered.

In step S102, the print server 300 buffers a page start delimiter "% PageStart" and the like in an output buffer. Furthermore, the print server 300 sets a target page to be buffered in the output buffer. A target page is sequentially set from the first page. When the process returns from step S110 to step S102 again, the next page is set as a target page. There is created a PDF file serialized in the order in which the print server 300 has buffered the pages in the output buffer. Subsequently, the print server 300 parses a PDF object forming the target page included in the received PDF file, from the top of the PDF file (S103). Note that when the process returns from step S107 to step S103, the PDF object already parsed is excluded from objects to be parsed.

In step S104, the print server 300 determines whether the parsed PDF object is an object to be rendered by the image forming apparatus 100, based on the information obtained in step S101. When the parsed PDF object is an object to be rendered (YES in S104), the process proceeds to step S105. When the parsed PDF object is not an object to be rendered (NO in S104), the process proceeds to step S106.

In step S105, the print server 300 buffers the PDF object in the output buffer. Then, the process proceeds to step S107. In step S106, the print server 300 buffers the PDF object in a temporary buffer. Then, the process proceeds to step S107.

In step S107, the print server 300 determines whether the reading of the PDF objects of the target page has been completed. When it is determined that the reading has been completed (YES in S107), the process proceeds to step S108. When it is determined that the reading has not been completed (NO in S107), the process returns to step S103.

In step S108, the print server 300 buffers a page end delimiter "% PageEnd" in the output buffer. Subsequently, the print server 300 puts data in the temporary buffer in the output buffer (S109).

In step S110, the print server 300 determines whether the reading of the entire PDF file has been completed. That is, it is determined whether the reading of the PDF objects of all the pages has been completed. When it is determined that the reading of the PDF file has been completed (YES in S110), the flow is terminated since creation of the serialized PDF file has been completed. When it is determined that the reading of the PDF file has not been completed (NO in S110), the process returns to step S102.

Figure 9:
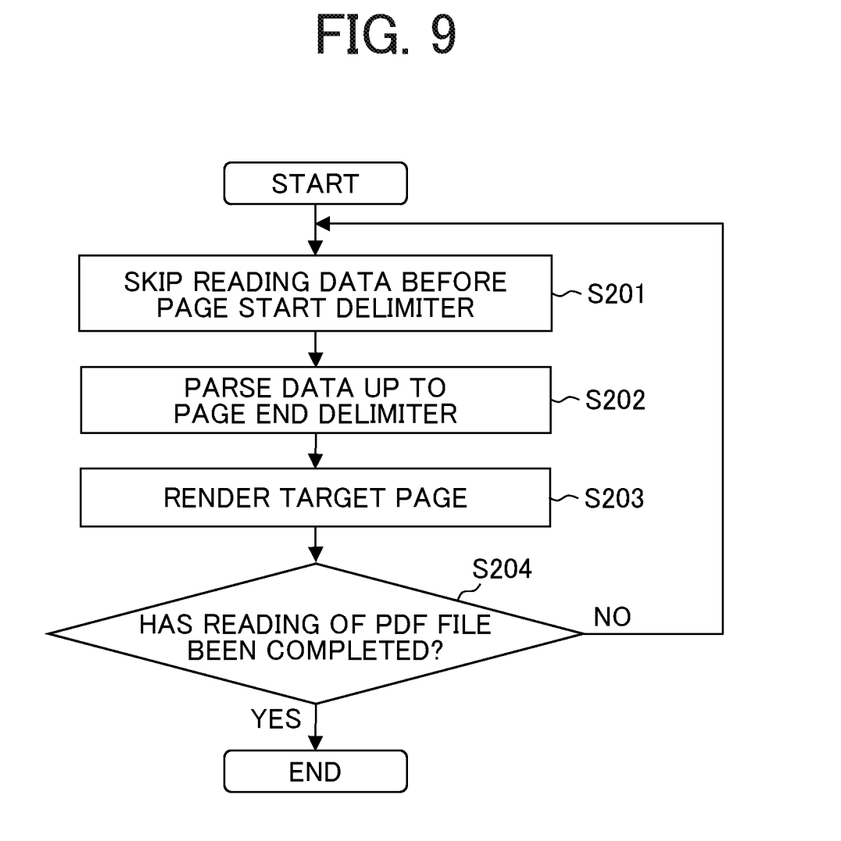
FIG. 9 is a flowchart for describing an example of operation of the image forming apparatus according to the embodiment of the present invention.

FIG. 9 is a flowchart for describing an example of operation of the image forming apparatus 100 according to the embodiment of the present invention. According to the flowchart illustrated in FIG. 9, the image forming apparatus 100 outputs the serialized PDF file received from the print server 300.

In step S201, the print data analyzer 154 of the image forming apparatus 100 skips reading data before a page start delimiter of the received PDF file. Subsequently, the print data analyzer 154 of the image forming apparatus 100 parses data up to the page end delimiter (S202). Then, the image forming apparatus 100 reads the PDF objects to render the target page, based on a result of the parsing (S203).

In step S204, the image forming apparatus 100 determines whether the entire PDF file has been read. When it is determined that the entire PDF file has been read (YES in S204), the flow is terminated since rendering has been completed. When it is determined that the entire PDF file has not been read, the process returns to step S201 for processing on the next page as a target page.

In the embodiment of the present invention, the serializing process of a PDF file has been described. Meanwhile, the serializing process according to the embodiment of the present invention can be applied to any document file as long as the document file is a random-access file.

As described above, according to the embodiment of the present invention, when receiving a PDF file from the PC 200 in the communication system 1, the print server 300 can create a PDF file, by serializing the received PDF file, such that objects that can be rendered and objects that cannot be rendered are separated according to the rendering capability of the image forming apparatus 100. The image forming apparatus 100 can sequentially read and print data of each page of the serialized PDF file received from the print server 300.

That is, objects necessary for printing and objects unnecessary for printing included in print data are separated and arranged in order. Thus, the image forming apparatus can obtain the necessary objects and discard the unnecessary objects based on the arrangement.

Therefore, it is possible to effectively use the memory of the image forming apparatus.

Note that in the embodiment of the present invention, the PDF file is an example of a document file. The print server 300 is an example of an information processing apparatus. The page start delimiter is an example of first discrimination information. The page end delimiter is an example of second discrimination information. The PDF converter 255 is an example of a creation unit. The print data analyzer 154 is an example of an analyzer.

The embodiment of the present invention has been described above in detail. Meanwhile, the present invention is not limited to such a specific embodiment, and various modifications and alterations may be made within the scope of the gist of the present invention as defined in the claims.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus configured to communicate with an image forming apparatus, the information processing apparatus comprising:
processing circuitry configured to,
receive a first document file including data of a plurality of pages,
obtain support information indicating capabilities of the image forming apparatus,
serialize the first document file to create a second document file by, for each of the plurality of pages,
buffering, in an output buffer, first discrimination information indicating a start of a target page the plurality of pages,
buffering, in one of the output buffer and a temporary buffer, drawing objects associated with the target page based on the support information such that supported drawing objects that are renderable by the image forming apparatus are buffered in the output buffer and unsupported drawing objects that are not renderable are buffered in the temporary buffer,
buffering, in the output buffer, second discrimination information indicating an end of the target page, and
moving the unsupported drawing objects from the temporary buffer to the output buffer after buffering the second discrimination information such that the second discriminator information discriminates the supported drawing objects from the unsupported drawing objects among the drawing objects included in the first document file; and
a communication interface configured to transmit the created second document file to the image forming apparatus.

2. The information processing apparatus according to claim 1, wherein the processing circuitry inserts the first discrimination information and the second discrimination information into the second document file such that,
the supported drawing objects supported are within a body of the second document file in a range from the first discrimination information to the second discrimination information, and
the unsupported drawing objects are within the body of the second document file in a range from the second discrimination information to a next first discrimination information following the first discrimination information.

3. The information processing apparatus according to claim 1,
wherein
the communication interface obtains, from the image forming apparatus, the support information indicating whether the drawing objects are supported by the image forming apparatus, and
the processing circuitry is configured to insert the second discrimination information directly in the second document file based on the support information obtained from the image forming apparatus.

4. The information processing apparatus according to claim 1, wherein the processing circuitry is further configured to insert, into a header of the second document file, information indicating that the second document file has been created from the first document file.

5. The information processing apparatus according to claim 4, wherein the processing circuitry is further configured to insert, into the header of the second document file an indication that the second document file includes the first discrimination information and the second discrimination information in a body thereof.

6. An image forming apparatus comprising:
a communication interface configured to receive a second document file created from a first document file including data of a plurality of pages, the second document file having been created by, for each of the plurality of pages, buffering, in an output buffer, first discrimination information indicating a start of a target page the plurality of pages, buffering, in one of the output buffer and a temporary buffer, drawing objects associated with the target page based on support information such that supported drawing objects that are renderable by the image forming apparatus are buffered in the output buffer and unsupported drawing objects that are not renderable are buffered in the temporary buffer, buffering, in the output buffer, second discrimination information indicating an end of the target page, and moving the unsupported drawing objects from the temporary buffer to the output buffer after buffering the second discrimination information such that the second discriminator information discriminates the supported drawing objects from the unsupported drawing objects among the drawing objects included in the first document file;

processing circuitry configured to determine whether to use, for printing, a drawing object included in the second document file by skipping reading of data in the second document file prior to the first discrimination information, and after reading the first discrimination information, reading the data in the second document file up to the second discrimination information; and a printing device configured to print based on the second document file according to the determination.

7. A non-transitory recording medium storing a plurality of instructions which, when executed by one or more processors of an information processing apparatus communicably connected with an image forming apparatus cause the one or more processors to, receive a first document file including data of a plurality of pages;

obtain support information indicating capabilities of the image forming apparatus;

serialize the first document file to create a second document file by, for each of the plurality of pages,
buffering, in an output buffer, first discrimination information indicating start of a target page of the plurality of pages,
buffering, in one of the output buffer and a temporary buffer, drawing objects associated with the target page based on the support information such that supported drawing objects that are renderable by the image forming apparatus are buffered in the output buffer and unsupported drawing objects that are not renderable are buffered in the temporary buffer,
buffering, in the output buffer, second discrimination information indicating an end of the target page, and
moving the unsupported drawing objects from the temporary buffer to the output buffer after buffering the second discrimination information such that the second discriminator information discriminates the supported drawing objects from the unsupported drawing objects among the drawing objects included in the first document file; and transmit the second document file to the image forming apparatus.

8. The non-transitory recording medium according to claim 7, wherein the plurality of instructions, when executed by the one or more processors, configure the one or more processors to insert the first discrimination information and the second discrimination information into the second document file such that,
the supported drawing objects are within a body of the second document file in a range from the first discrimination information to the second discrimination information, and
the unsupported drawing objects are within the body of the second document file in a range from the second discrimination information to a next first discrimination information following the first discrimination information.

9. The non-transitory recording medium according to claim 8, wherein the plurality of instructions, when executed by the one or more processors, configure the one or more processors to,
obtain, from the image forming apparatus, the support information indicating whether the drawing objects are supported by the image forming apparatus, and
insert the second discrimination information directly in the second document file based on the support information obtained from the image forming apparatus.

10. The non-transitory recording medium according to claim 7, wherein the plurality of instructions, when executed by the one or more processors, configure the one or more processors to insert, into a header of the second document file, information indicating that the second document file has been created from the first document file.

11. The non-transitory recording medium according to claim 10, wherein the plurality of instructions, when executed by the one or more processors, configure the one or more processors to insert, into the header of the second document file an indication that the second document file includes the first discrimination information and the second discrimination information in a body thereof.

* * * * *